United States Patent [19]

Kojima

[11] Patent Number: 5,018,216
[45] Date of Patent: May 21, 1991

[54] METHOD OF EXTRACTING A FEATURE OF A CHARACTER

[75] Inventor: Keiji Kojima, Kawasaki, Japan
[73] Assignee: Ricoh Company, Ltd., Japan
[21] Appl. No.: 378,161
[22] Filed: Jul. 11, 1989

[30] Foreign Application Priority Data

Jul. 20, 1988 [JP] Japan .................................. 63-181368

[51] Int. Cl.$^5$ .............................................. G06K 9/48
[52] U.S. Cl. ............................................ 382/22; 382/9; 382/21
[58] Field of Search ....................... 382/21, 22, 20, 18, 382/9

[56] References Cited

U.S. PATENT DOCUMENTS

| | | | |
|---|---|---|---|
| 3,970,991 | 7/1976 | Kawada et al. ....................... | 382/20 |
| 4,163,214 | 7/1979 | Komori et al. ....................... | 382/20 |
| 4,700,402 | 10/1987 | Okai et al. ........................... | 382/21 |
| 4,757,551 | 7/1988 | Kobayashi et al. .................. | 382/18 |
| 4,903,312 | 2/1990 | Sato ....................................... | 382/21 |
| 4,903,313 | 2/1990 | Tachikawa ............................ | 382/9 |

Primary Examiner—David K. Moore
Assistant Examiner—Yon Jung
Attorney, Agent, or Firm—Mason, Fenwick & Lawrence

[57] ABSTRACT

A method of extracting a feature of a character includes the steps of dividing a contour image of a character into a plurality of segments by a pair of dividing lines provided for the contour image, dividing each of the segments into a plurality of sub-segments, combining the sub-segments together to thereby form a plurality of combined segments in accordance with a predetermined rule indicative of a combination of the sub-segments, and extracting a feature of each of the combined segments.

17 Claims, 19 Drawing Sheets

| ΔIP VECTOR | DIRECTION CODE |
|---|---|
| ( 0  1 ) | # 1 |
| ( 1  0 ) | # 2 |
| ( 0 -1 ) | # 3 |
| (-1  0 ) | # 4 |

FIG. 7

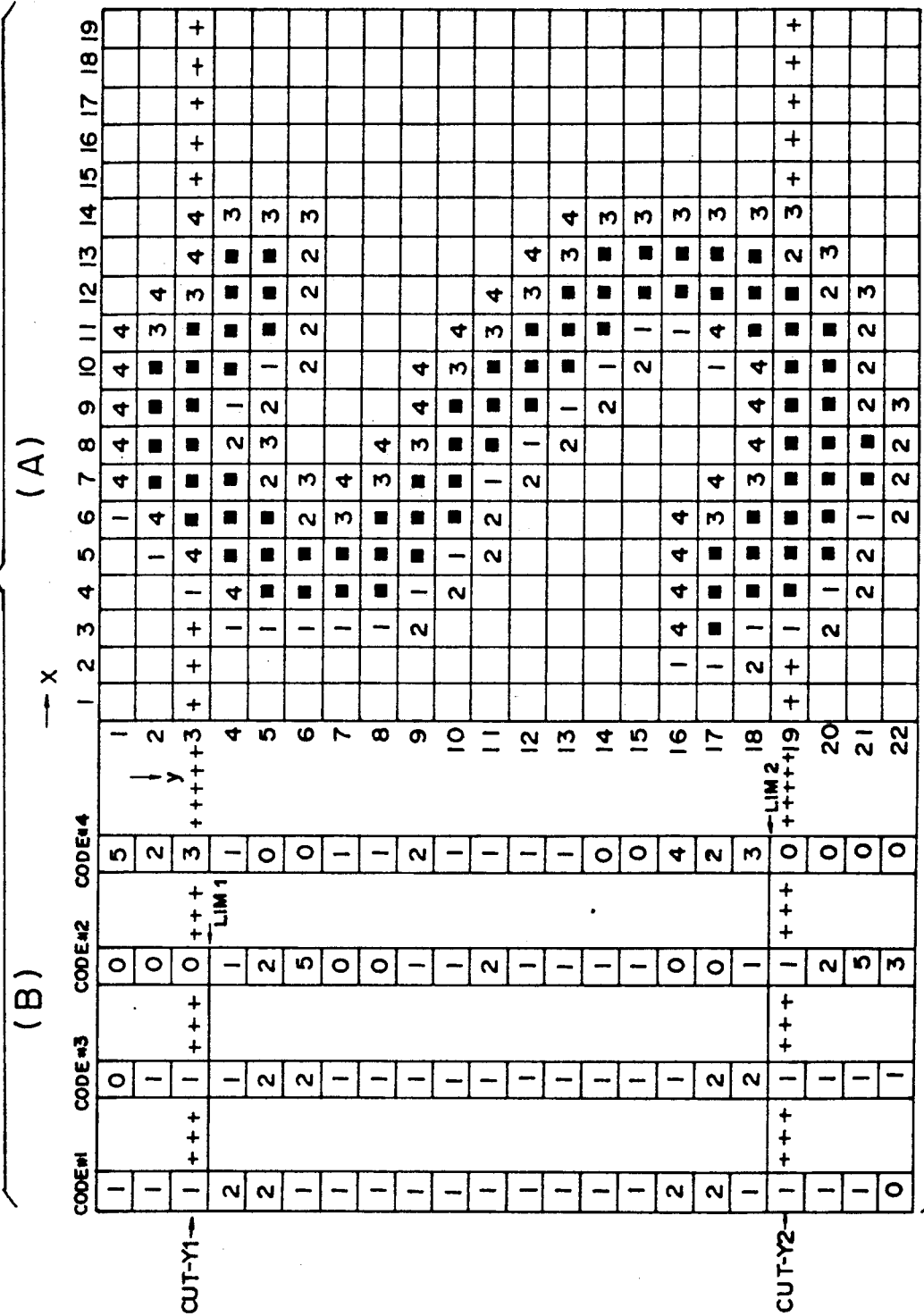

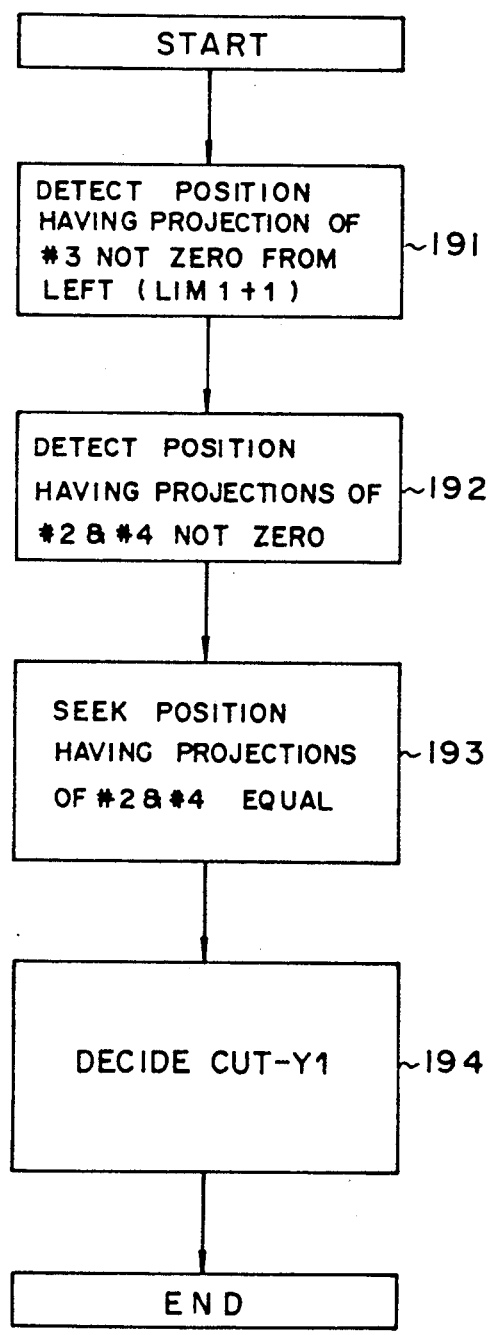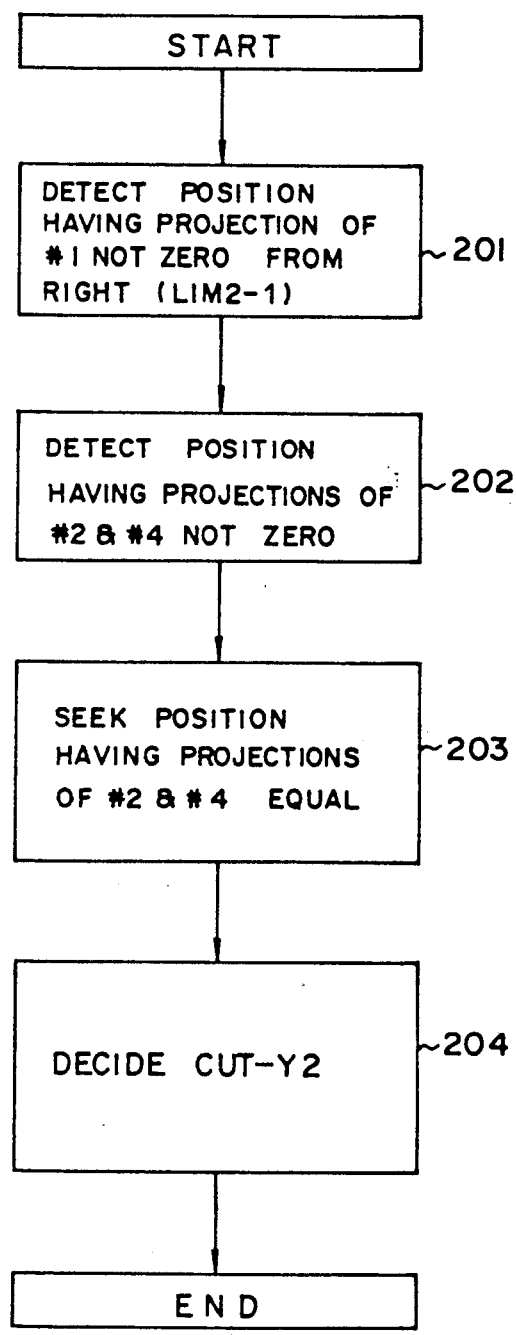

FIG. 16

| SEGMENT# (seg) | 1 | | | | 2 | | | | 3 | | | | 4 | | | |
|---|---|---|---|---|---|---|---|---|---|---|---|---|---|---|---|---|
| SUB SEGMENT#(rgn) | 1 | 2 | 3 | 4 | 1 | 2 | 3 | 4 | 1 | 2 | 3 | 4 | 1 | 2 | 3 | 4 |
| COMBINED# | 1 | 2 | 3 | 4 | 5 | 6 | 7 | 8 | 1 | | | | | | | |

METHOD OF EXTRACTING A FEATURE OF A CHARACTER

BACKGROUND OF THE INVENTION

The present invention generally relates to a method of extracting a feature of a character (including a symbol and a numeral) for character recognition, and particularly to a method of extracting a feature of a character which is affected by the font style or the size of a character to be recognized.

Currently, various character feature extracting methods have been proposed. For example, U.S. Pat. No. 4,757,551 proposes a method in which an image of a character obtained by optically scan is divided into a plurality of regions, and a histogram of direction codes is generated for each of the divided regions. However, the proposed method cannot provide feature quantities indicative of the shape of a character with high precision. For example, the proposed method is not well organized so as to extract a feature of an ornamental portion of a character.

In order to overcome the above-mentioned problem, an improved method for extracting a feature of a character has been proposed in U.S. patent application Ser. No. 191,608, the disclosure of which is hereby incorporated by reference. The improved method is less affected by the font style or the size of a character to be recognized. However, there is room for some improvements.

SUMMARY OF THE INVENTION

It is therefore a general object of the present invention to provide a further improved method of extracting a feature of a character suitable for character recognition.

A more specific object of the present invention is to provide a method of extracting a feature of a character capable of providing feature quantities indicative of a topological feature of an ornamental portion of a character.

The above objects of the present invention can be achieved by a method of extracting a feature of a character comprising the steps of dividing a contour image of a character into a plurality of segments by a pair of dividing lines provided for the contour image; dividing each of the segments into a plurality of sub-segments; combining the sub-segments together to thereby form a plurality of combined segments in accordance with a predetermined rule indicative of a combination of the sub-segments; and extracting a feature of each of the combined segments.

The above-mentioned objects of the present invention can also be achieved by a method of extracting a feature of a character, comprising the steps of dividing a contour image of a character into a plurality of segments by a pair of dividing lines provided for the contour image; dividing each of the segments into a plurality of sub-segments; combining the sub-segments together to thereby form a plurality of combined segments in accordance with a predetermined first rule indicative of a combination of the sub-segments; combining the combined segments together to thereby form a plurality of recombined segments in accordance with a predetermined second rule indicative of a recombination of the combined segments; extracting a first feature of each of the combined segments; and extracting a second feature of each of the recombined segments.

Other objects, features and advantages of the present invention will become apparent from the following detailed description when read in conjunction with the accompanying drawings.

BRIEF DESCRIPTION OF THE DRAWINGS

FIG. 7 is a view illustrating how to define dividing lines;

FIG. 11 is a view illustrating dividing lines defined by an algorithm;

FIG. 13A and 13B are flowcharts of still another algorithm for defining dividing lines;

FIG. 16 is a view illustrating a table used for combining sub-segments;

DESCRIPTION OF THE PREFERRED EMBODIMENTS

A description is given of a preferred embodiment of the present invention.

Figure 1:
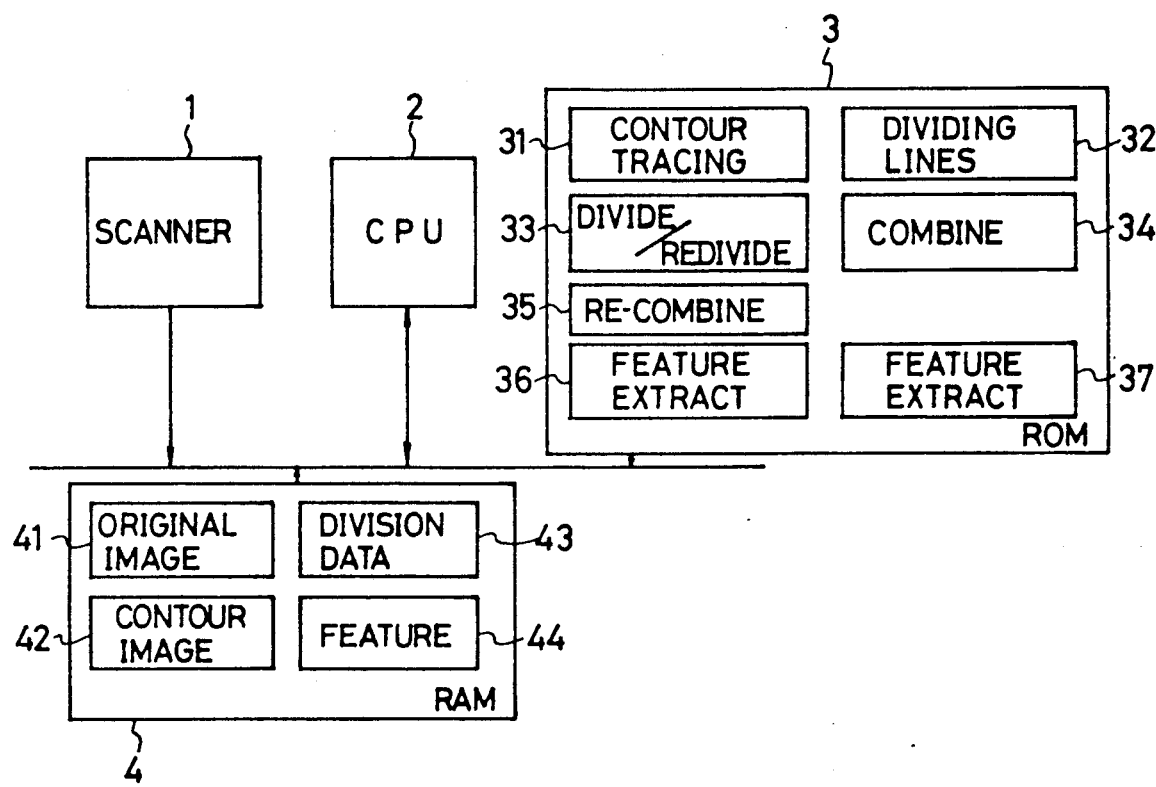
FIG. 1 is a block diagram of a hardware configuration capable of implementing embodiments of the present invention.

FIG. 1 is a block diagram capable of implementing a preferred embodiment of the present invention. An optical scanner 1 optically reads a character on a document and generates binary-valuded image data in which "1" indicates a black pixel and "0" indicates a white pixel. The binary-valuded image data is stored in an original image storing area 41 formed in a data memory 4, which is formed by a random access memory (hereafter simply referred to as a RAM). A central processing unit (hereafter simply referred to as a CPU) 2 executes various processes controlled by programs stored in a program memory 3 formed by a read only memory (hereafter simply referred to as a ROM) 3. The ROM 3 stores programs described below. The CPU 2 executes the processes in accordance with a procedure shown in FIG. 2 based on the programs stored in the ROM 3.

The CPU 2 commences to clockwise or counterclockwise trace a two-dimensional arrangement consisting of white pixels or black pixels related to a contour of a character image stored in the original image storing area 41. Then the CPU 2 assigns white pixels or black pixels arranged along the contour direction codes so as to form a two-dimensional arrangement of direction code assigned white or black pixels related to the contour. The obtained two-dimensional arrangement is stored in a contour image storing area 42 formed in the RAM 4. The above mentioned procedure is related to step 101 shown in FIG. 2, and the CPU 2 executes the step 101 procedure in accordance with a contour tracing program 31.

Next, the CPU 2 generates vertical and horizontal projections of the direction codes assigned to the contour image. A vertical projection of the direction codes is obtained by scanning the two-dimensional arrangement of direction code assigned white or black pixels in the vertical direction thereof and counting the number of each of the direction codes. Similarly, a horizontal projection of the direction codes is obtained by scanning the two-dimensional arrangement with the direction codes assigned in the horizontal direction and counting the number of each of the direction codes. Thereafter, the CPU 2 defines a pair of dividing lines which is to be positioned at upper and lower portions of the character on the basis of the obtained vertical and horizontal projections. The above-mentioned procedure is related to step 102 shown in FIG. 2, and the CPU 2 executes the step 102 procedure in accordance with a dividing line defining program 32.

Then, the CPU 2 divides the contour image stored in the contour image storing area 42 into a plurality of segments by the pair of dividing lines, and further equally divides each of the divided segments into n sub-segments. The obtained sub-segments are stored in a division data storing area 43 formed in the RAM 4. This procedure is related to step 103, which is executed by the CPU 2 in accordance with a division/re-division program 33.

Thereafter, the CPU 2 combines some sub-segments (16 in total) together so as to form a plurality of combined segments, and positional information for each of the combined segments is stored in the division data storing area 43. The above-mentioned procedure is related to step 104 shown in FIG. 2, and is executed by the CPU 2 in accordance with a combining program 34.

Then, the CPU 2 further combines (recombines) some of combined segments together so as to form a plurality of recombined segments, and positional information for each of the recombined segments is stored in the division data storing area 43. The above procedure is related to step 105, and is executed by the CPU 2 in accordance with a recombining program 35.

Thereafter, the CPU 2 generates a histogram of the direction codes for every combined segment. The histogram thus obtained is stored, as features for use in character recognition, in a feature storing area 44 formed in the RAM 4. This procedure is related to step 106 shown in FIG. 2, and is executed by the CPU 2 in accordance with a feature extraction program 36.

Further, the CPU 2 generates a histogram for the direction codes for every recombined segment, and stores in the feature storing area 44, as features used for roughly determining which one of the predetermined classifications of characters is the most relevant to a character to be recognized. This procedure is carried out prior to the execution of character recognition based on the histogram of the direction codes obtained for every combined segment. The above-mentioned procedure is related to step 107 shown in FIG. 2, and is executed by the CPU 2 in accordance with a feature extraction program 37.

Figure 2:
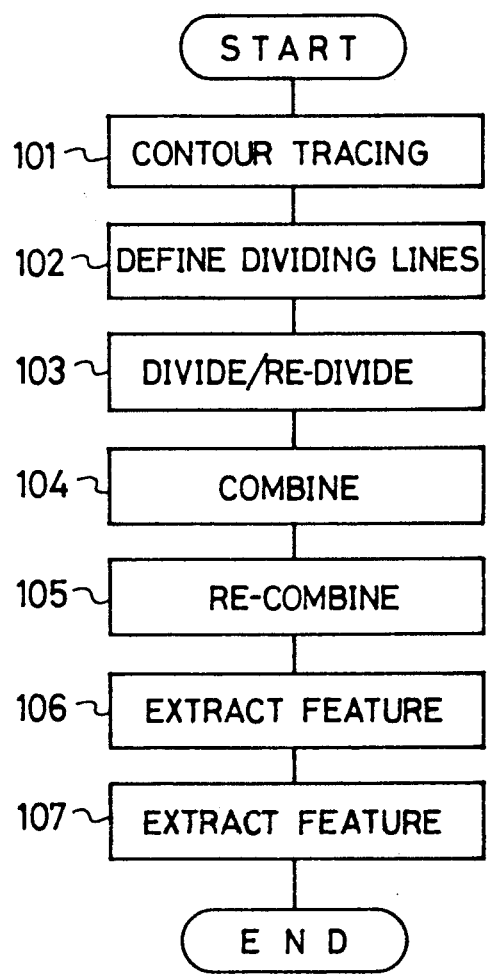
FIG. 2 is a flowchart of a process performed in the present invention.

A description is given of each step shown in FIG. 2.

STEP 101

In step 101, the CPU 2 raster-scans the character image stored in the original image storing area 41 formed in the RAM 4. The raster-scan starts from top of an image storing area, which includes one segmented character to be recognized. Then, the CPU 2 detects a position at which a change from a white pixel to a black pixel occurs for the first time, and uses the detected point as a start point from which the contour tracing starts.

Figure 3A:
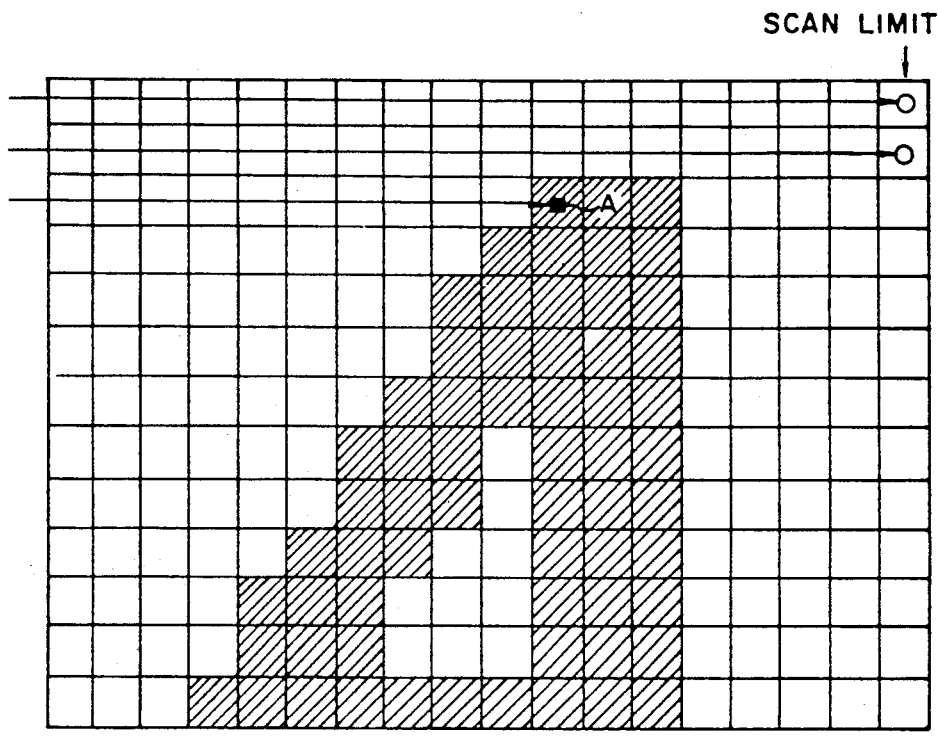
FIGS. 3A and 3B are views for explaining detection of a start point for contour tracing which is obtained by raster-scanning a character image.
Figure 3B:
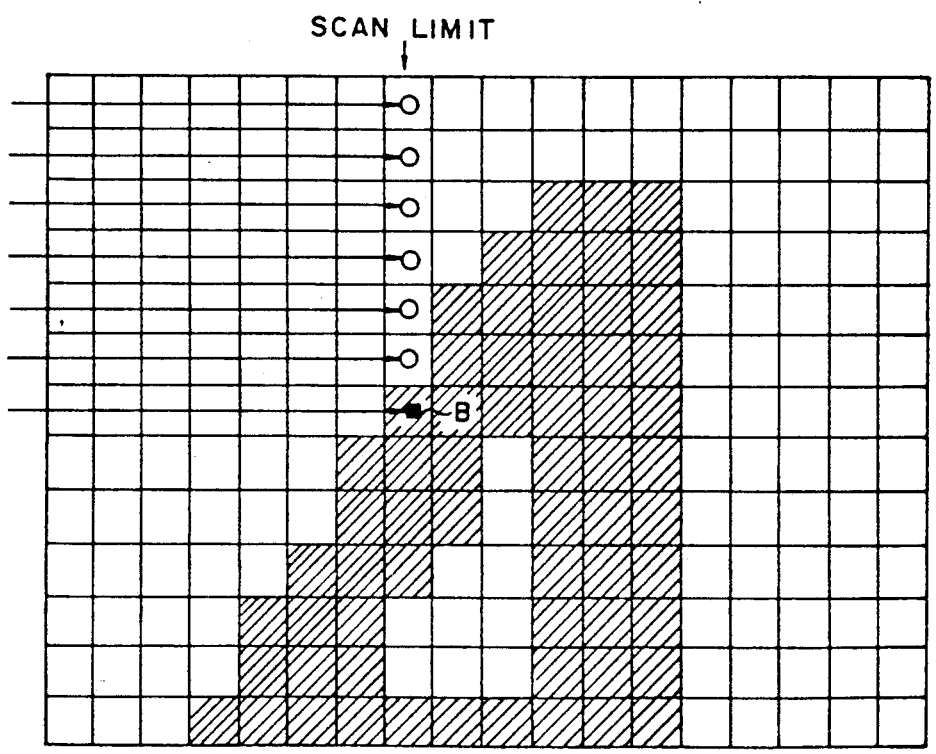

FIG. 3A shows an example in which a scan limit at which the scanning is shifted to the next scanning line is provided on the right-hand end of the image storing area. FIG. 3B shows another example in which the scan limit is provided at an intermediate position of the image storing area. It will be seen from FIGS. 3A and 3B that the start point of the contour tracing is not always detected at a top end of the character, and depends on the setting of the scan limit.

Subsequently, the CPU 2 clockwise or counterclockwise traces either white pixels or black pixels arranged along the contour of the character image stored in the original image storing area 41 in the RAM 4, and assigns direction codes to the white or black pixels related to the contour. The contour tracing starts from the detected start point in accordance with the contour tracing program 31 stored in the ROM 30.

Figures 4A, 4B, 4C:
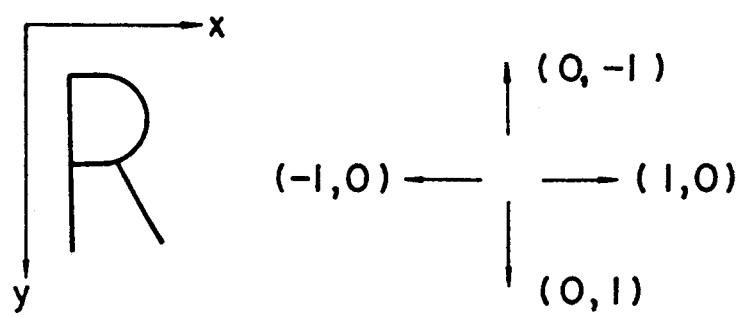
FIGS. 4A through 4C are views for explaining direction codes used in the present invention.

FIGS. 4A through 4C are views for explaining the direction codes. Assuming that the position (coordinates) of a pixel of concern i.e., a current tracing point, is represented by a positional vector P, the movement from the current tracing point to the next tracing point is represented by any one of four unit vectors $\Delta P$ together with the positional vector P. Therefore, the position of the next tracing point is represented by $P + \Delta P$. Four unit vectors $\Delta P$ are assigned respective direction codes shown in FIG. 4C. The feature quantities of the contour can be described by using the direction codes.

A further description is given of the contour tracing. It is now assumed that white pixels arranged along the contour of a character are traced.

Figure 5A:
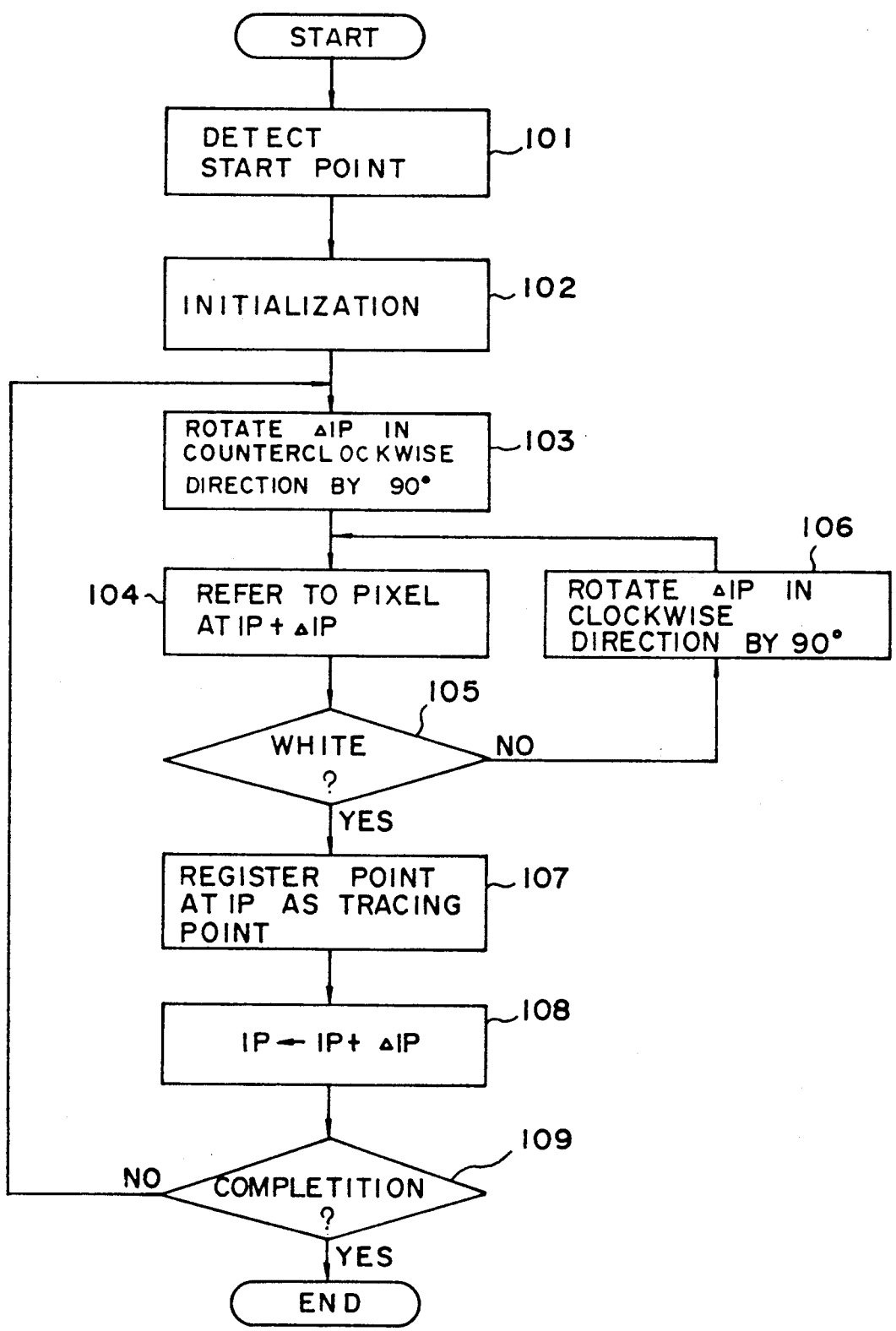
FIG. 5A is a flowchart of a process for assigning direction codes to a contour portion of a character image.

Referring to FIG. 5A, a character image formed in the original image storing area 41 is raster-scanned and a first white pixel which is immediately followed by a black pixel in the main scanning direction (x direction) is sought (step 101 in FIG. 5A). Then, a vector $P + \Delta P$ with respect to the detected first white pixel which is positioned at the start point, is provided with an initial value (step 102). At this step, the vector P corresponds to the start point, and the unit vector $\Delta P$ related to the direction opposite to the x direction is selected.

Figure 5B:
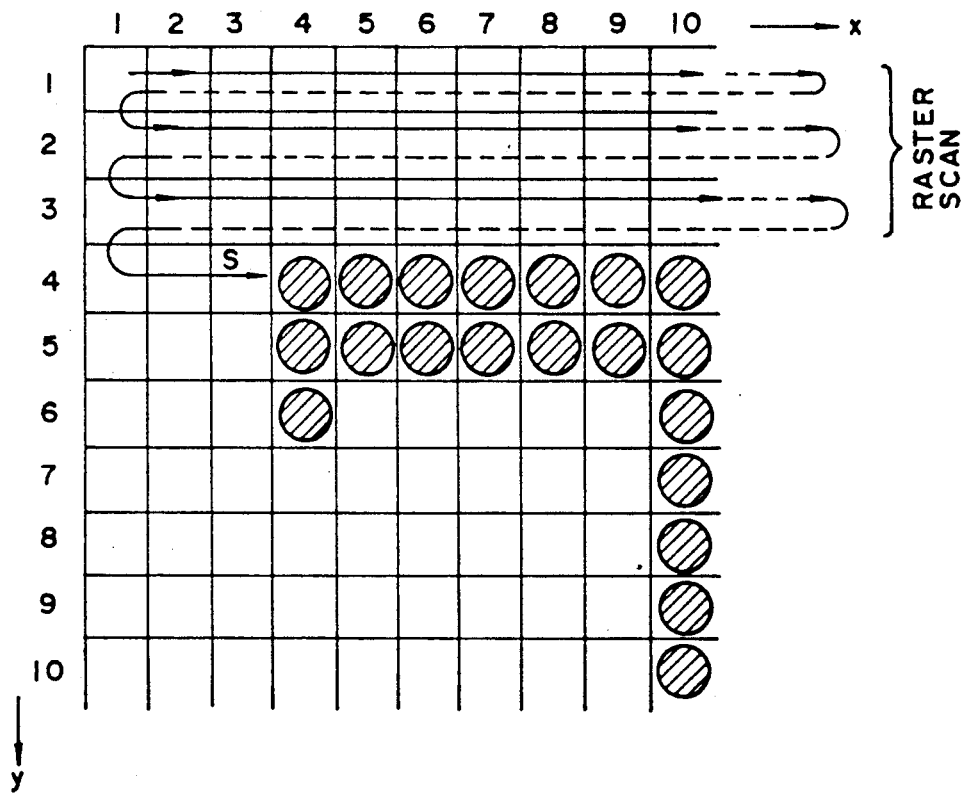
FIG. 5B is a view illustrating an initial operation of the contour tracing.

FIG. 5B is a view for explaining the initialization of the vector P and $\Delta P$ in detail. In this figure, hatched circles denote black pixels, and numerals aligned in the x and y directions denote coordinates. Further, arrows indicate the direction of the main scanning direction. In the illustrated example, a white pixel indicated by S is the first white pixel which is immediately followed by a black pixel in the x direction. Therefore, the white pixel S is designated as the start point. The position vector of the white pixel S is represented as $P=(3, 4)$. The main scanning direction related to the start point is in the right-hand direction. Therefore, the unit vector $\Delta P$ to be added to the position vector P indicative of the start point is a unit vector of the direction opposite to the x direction. That is, $\Delta P=(-1, 0)$.

Thereafter, the tracing procedure lets the tracing point move as follows. Four adjacent pixels positioned on upper, lower, left-hand and right-hand sides of the pixel of interest are sequentially accessed in the clockwise direction, starting from one adjacent pixel which is positioned on the left-hand side at an angle of 90° with respect to the direction in which the tracing proceeded towards the point of interest. If the first accessed pixel, i.e., the adjacent pixel positioned at an angle of 90° on the left-hand side with respect to the direction in which the tracing reached the point of interest is a white pixel, the tracing is shifted to this white pixel. Alternatively, if the first accessed pixel is a black pixel, the next (or second) adjacent pixel appearing next time in the clockwise direction is checked. If this pixel is a white pixel, the tracing point proceeds thereto, and alternatively if not a white pixel, the third adjacent pixel is checked. In this manner, the adjacent pixels are sequentially checked clockwise, and the first white pixel is detected.

The above process corresponds to a sequence of steps 103 to 107 in FIG. 5A. In step 103, the unit vector $\Delta P$ is rotated in the counterclockwise direction by an angle of 90°. Then, the pixel represented by the vector $P+\Delta P$ is referred to and checked as to whether or not it is a white pixel (steps 104 and 105). If the result is YES, the procedure proceeds to step 107 in which the pixel indicated b the vector P is registered as the tracing point. Alternatively, if the result is NO, the procedure proceeds to step 106 in which the unit vector $\Delta P$ is rotated clockwise by an angle of 90°. Then, step 104 and subsequent step 105 are carried out. In this manner, the tracing point subsequent to the point of interest is designated and registered. Subsequent to step 107, the current vector $P+\Delta P$ is inserted into the vector P (step 108). Then, it is checked whether or not the tracing is completed (step 109). In other words, it is checked whether or not the tracing has returned to the start point. If the tracing is not completed, the tracing procedure returns to step 103 and the sequence of steps 103 to 109 is performed in the manner described above. Alternatively, if the tracing returns to the start point, it is terminated.

Figure 6A:
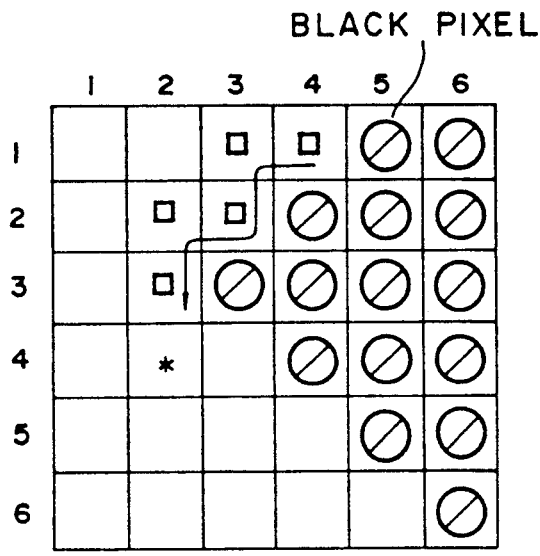
FIGS. 6A through 6C are views illustrating the process for assigning direction codes to the contour portion of the character image.
Figure 6B:
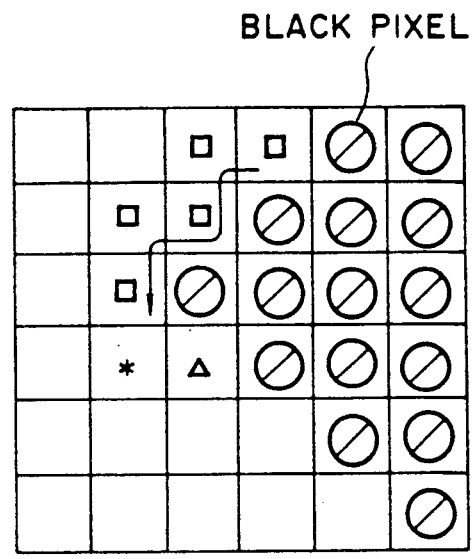
Figure 6C:
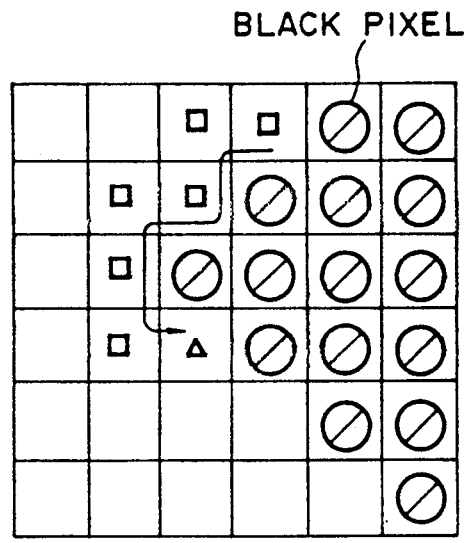

A concrete example of the above contour tracing process is shown in FIGS. 6A through 6C. FIG. 6A shows a state immediately before step 103 is carried out. A symbol □ denotes a registered tracing point. In the state shown in FIG. 6A, the pixel of interest $P=P+\Delta P$ at the position indicated by a symbol * is represented as $P=(2, 3)$ and $\Delta P=(0, 1)$. This corresponds to step 108 shown in FIG. 5A. With respect to this point of interest, the unit vector $\Delta P$ is rotated in the counterclockwise direction by 90° (step 103), so that $\Delta P=(1, 0)$ (right-hand direction). Then, a pixel at $P+\Delta P$ in which $P=(2, 4)$ and $\Delta P=(1, 0)$ is referred to (step 104). This pixel is located at the position indicated by a symbol Δ shown in FIG. 6B. Then, it is checked whether or not the pixel designated in step 104 is a white pixel (step 105). In the illustrated example, the pixel at the position Δ is a white pixel. Therefore, the point of interest indicated by the symbol * is registered as the tracing point (step 107). Then, the point of interest is shifted to the position Δ (step 108). At this time, $P=(2, 4)$ and $\Delta P=(1, 0)$ (right-hand direction). In this manner, the direction code corresponding to the unit vector $\Delta P$ is written in a storage region of the vector (the current tracing point) in the contour image storing area 42.

STEP 102

The CPU 2 refers to the direction codes assigned to white pixels arranged along the contour stored in the contour image storing area 42, and generates a projection of each of the different types of direction codes by projecting the contour image in the horizontal or vertical direction. This operation is controlled by the program 31 stored in the ROM 3 for generating the projection of each of the different types of the direction codes. The generated projection of the direction codes is stored in the division data storing area 43 for every different type.

Thereafter, the CPU 2 defines a pair of dividing lines for dividing the two-dimensional code assigned contour image by using the projection of each of the different types of the direction codes, and seeks positions at which the dividing lines intersect the contour image.

A description is now given of examples of the step 102 process for obtaining dividing lines.

EXAMPLE 1 OF STEP 102

Figure 7:
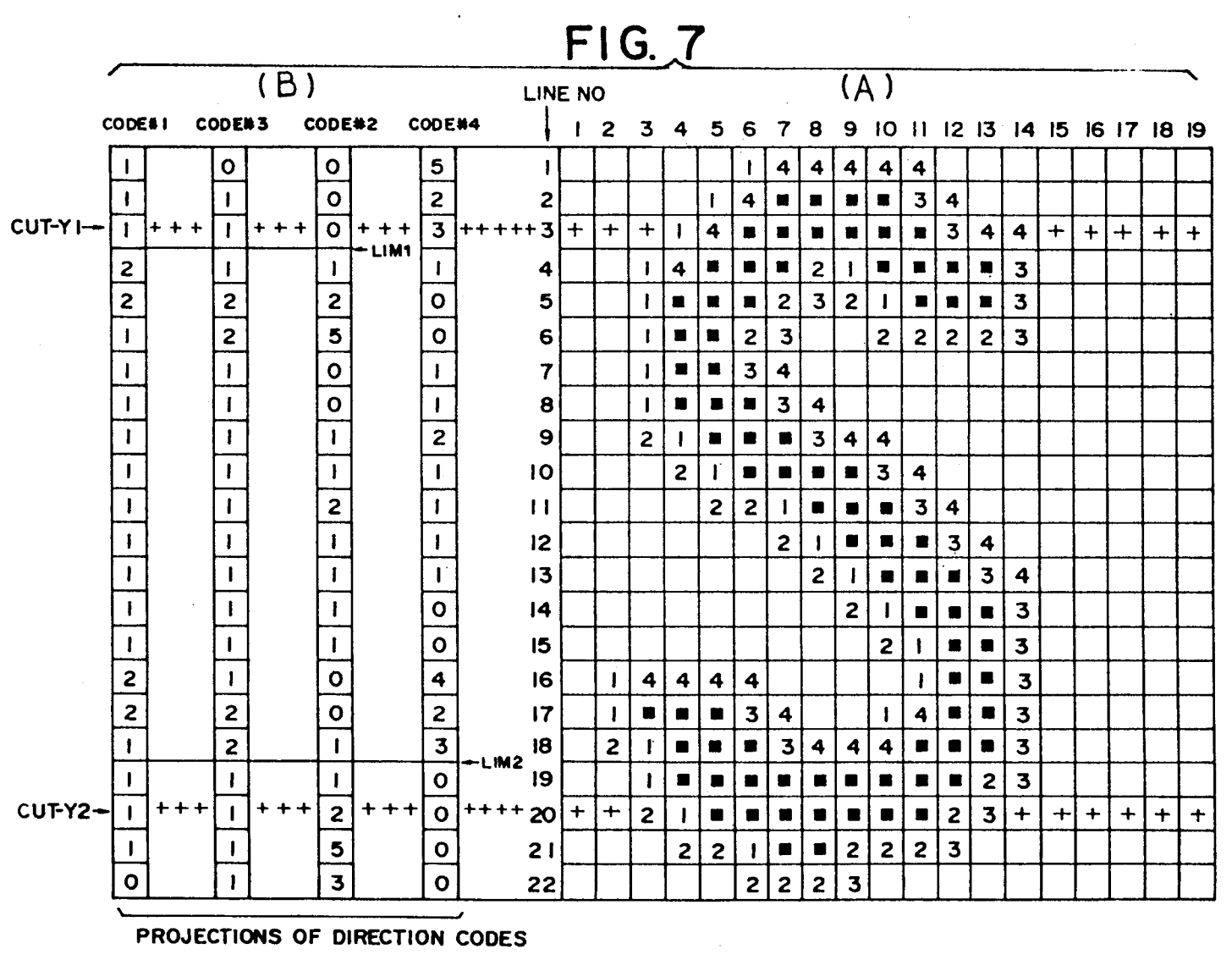

Example 1 uses the projection of each of the direction codes obtained in the horizontal direction for every type. Positions at which the projection of the direction code #1 coincides with the projection of the direction code #3, are sought starting from each of the top and bottom of the image storing area. The first coincidence between the direction codes #1 and #3 viewed from top of the image storing area corresponds to an upper dividing line extending in the horizontal direction. Likewise the first coincidence between the direction codes #1 and #3 viewed from the bottom of the image storing area corresponds to be a lower dividing line extending in the horizontal direction FIG. 7 is a view illustrating the example 1. FIG. 7(A) shows an image pattern of a character "S" formed in the image storing area, along with direction codes obtained by tracing white pixels adjacent to black pixels of the contour of the character image in the counterclockwise direction. The illustrated direction codes denote a group of the feature quantities of the contour part of the character "S". Hereinafter, the contour image assigned the direction codes is referred to as the two-dimensional contour feature image.

FIG. 7(B) shows a projection of each of the direction codes #1 to #4 obtained by projecting the feature contour image in the horizontal direction. The projection can be obtained as follows. For example, with respect to the first line of the image storing area, the number of the direction codes #1, #2, #3 and #4 are 1, 0, 0, and 5, respectively. The counted number obtained for each of the different types of the direction codes indicates a respective projection value. Likewise, the projections with respect to the lines 2 to 22 can be obtained. In FIG. 7(B), CUT-Y1 and CUT-Y2 indicate dividing lines at the upper and lower portions of the character image, respectively, which are obtained in the following manner. In FIG. 7(B), the projections of the direction codes #1 to #4 are shown.

Figure 8A:
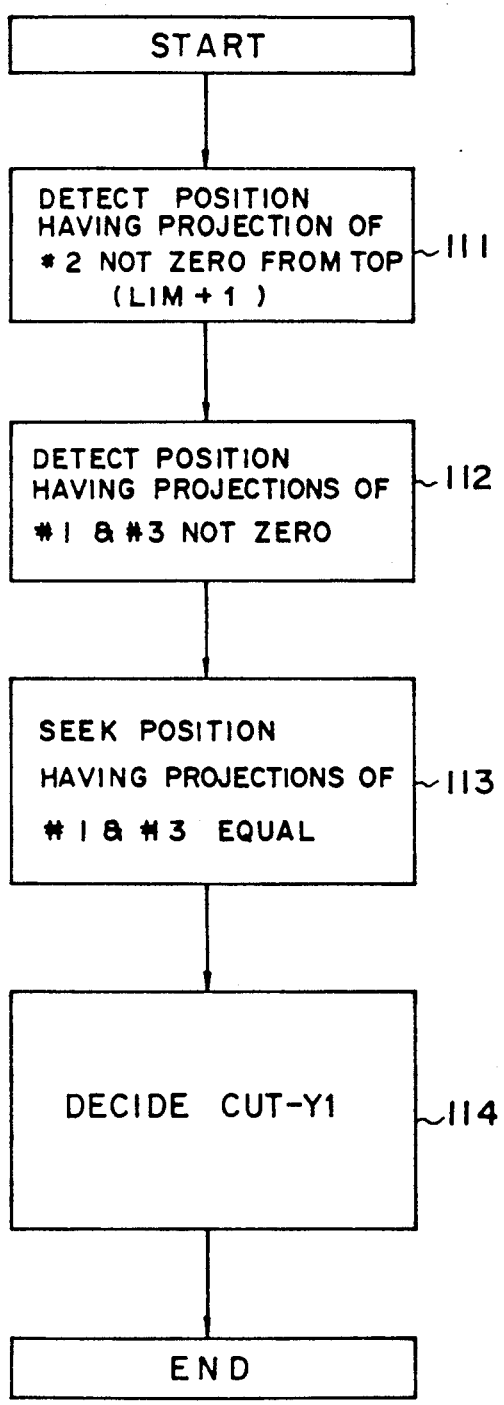
FIG. 8A and 8B are flowcharts of an algorithm for defining dividing lines.
Figure 8B:
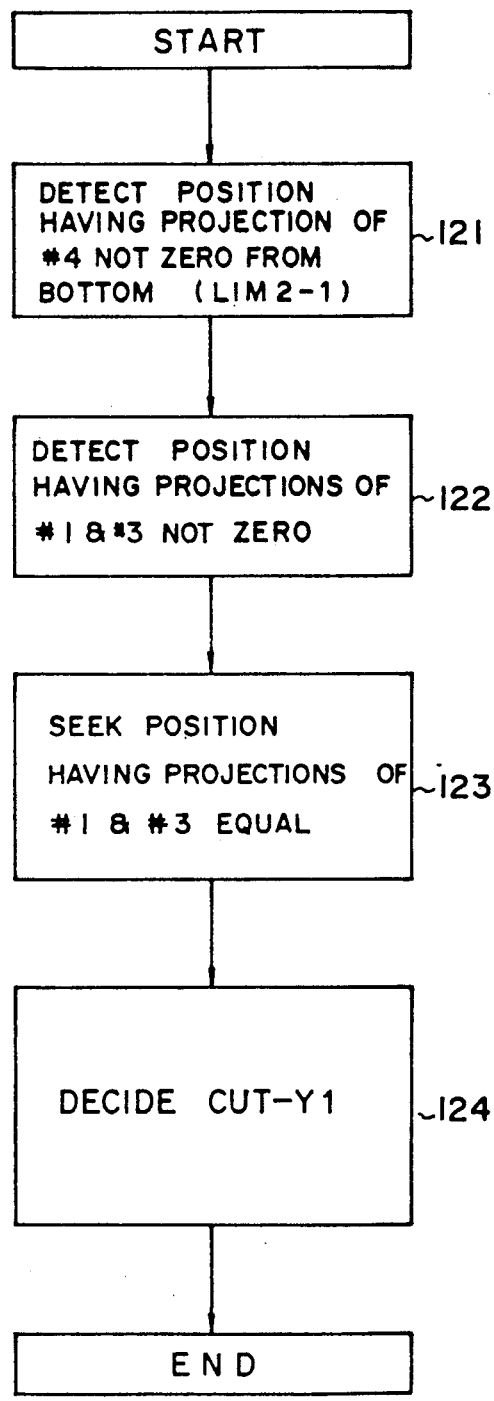

FIG. 8A is a flowchart of an algorithm for defining the dividing line CUT-Y1 to be provided at an upper portion of the character image, and FIG. 8B is a flowchart of an algorithm for defining the lower dividing line CUT-Y2 to be provided at a lower portion thereof. The algorithm for the dividing line CUT-Y1 has a symmetrical relationship with the algorithm for the dividing line CUT-Y2. A description is now given of the algorithm for the dividing line CUT-Y1.

Step 111 of FIG. 8A is a step for deciding an end position of a range for seeking the dividing line CUT-Y1. This step is used for detecting a thickness of the character. In the example of FIG. 7(A), the first position where the value of the projection of the direction code #2 in the horizontal direction becomes equal to a value other than zero, is located on the line 4. It is now assumed that the position of the projection of the direction code #2 on the line 4 thus obtained is represented by LIM1+1. Then the end position of the range for seeking the dividing line CUT-Y1 is decided to be a position on the column related to the direction code #2 preceding the position LIM1+1 by one line. The end position of the range thus obtained is represented by LIM1.

Step 112 defines a procedure for deciding a start position of the range for seeking the dividing line CUT-Y1. This is done by obtaining a position at which both the values of the projections of the direction codes #1 and #3 projected in the horizontal direction become equal to values other than zero. The start position of the range thus obtained corresponds to the top end of the character image. In the example of FIG. 7(A), the line 2 is the start position of the range.

Steps 113 and 114 define a condition for deciding the dividing line CUT-Y1. In step 113, a position at which the first coincidence between the values of the projections of the direction codes #1 and #3 is obtained, is downwardly sought starting from the line next to the line obtained in step 112, i.e., the line 3. Then, when the first coincidence is detected, a line having the first coincidence is decided to be the dividing line CUT-Y1 (step 113). In the example of FIG. 7(A), the line 3 is decided to be the dividing line CUT-Y1, which is represented by the alignment of '+'. When the position satisfying the above condition is not found, a line having the end position LIM1 of the range is decided to be the dividing line CUT-Y1 (step 114).

The algorithm for deciding the dividing line CUT-Y2 on the lower side of the character region is now described by referring to FIG. 8B. In step 121, a position at which the value of the projection of the direction code #4 becomes equal to a value other than zero is sought from the bottom of the region of FIG. 7(A). The detected position is represented by LIM2−1. A position LIM2 following the position LIM2−1 is determined to be an end position of a range for seeking the dividing line CUT-Y2. Then in step 122, a position at which the values of the projections of the direction codes #1 and #3 in the horizontal direction become equal to values other than zero is upwardly sought starting from the bottom of the region. The detected position in step 122 is the lowermost position of the character image. Thereafter, a position at which the first coincidence between the direction codes #1 and #3 is obtained, is upwardly sought starting from the line preceding the line obtained in step 122. When such a position is detected, a line related to the detected position is defined as the region dividing line CUT-Y2 (step 123). When such a position is not detected, the line having the end position LIM2 is decided to be the dividing line CUT-Y2 (step 124).

Figure 9A:
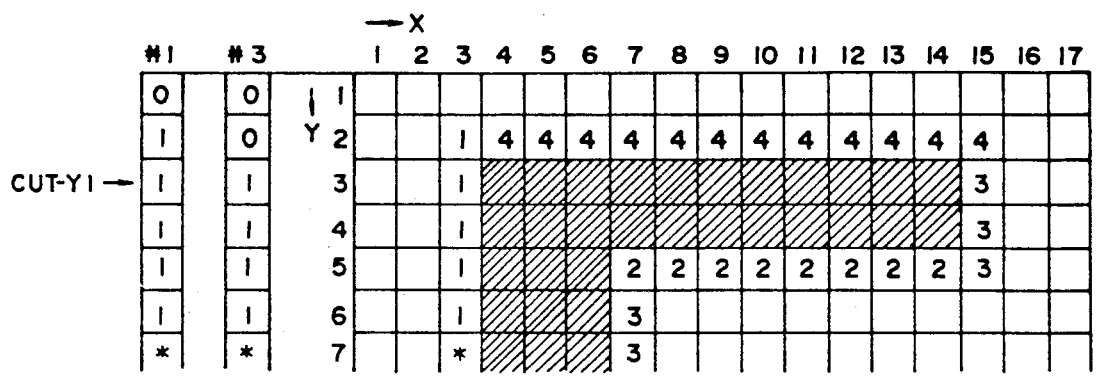
FIGS. 9A through 9C are views illustrating advantages resulting from the employment of the dividing lines.
Figure 9B:
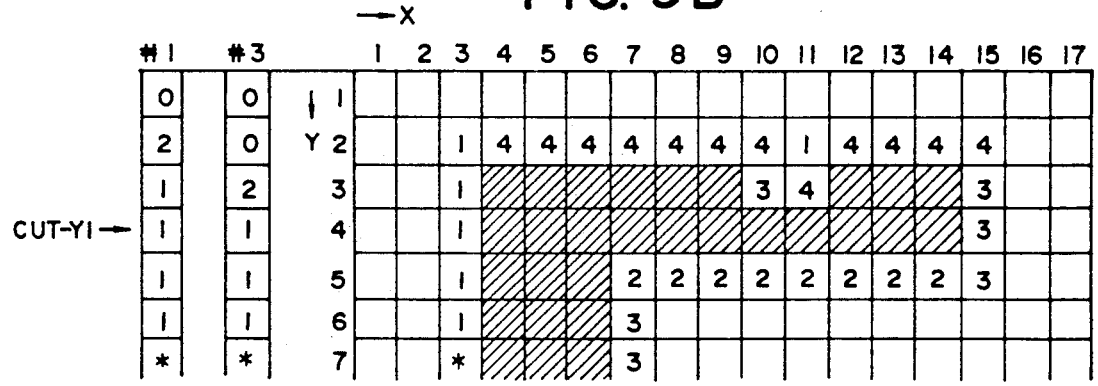
Figure 9C:
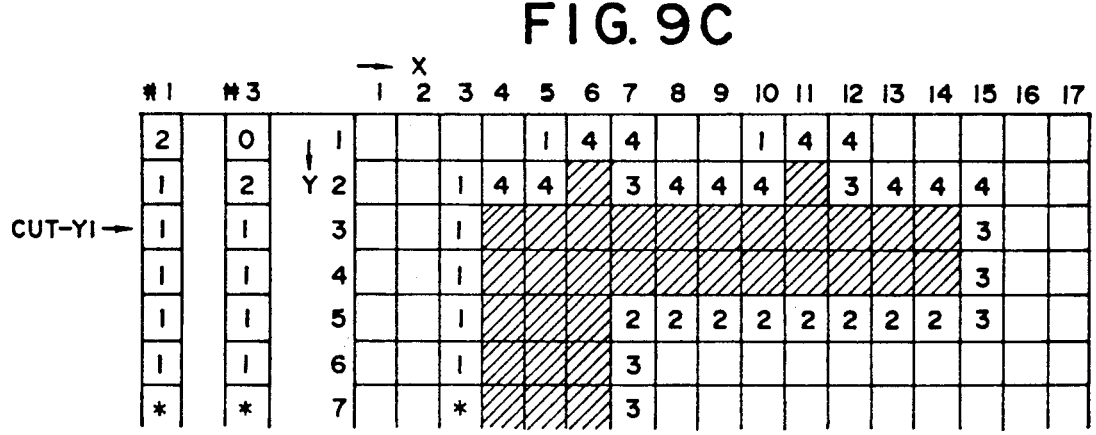

The above condition for defining the dividing line has the function of eliminating noise contained in the character image. FIGS. 9A through 9C are views for illustrating the above-mentioned advantage. FIG. 9A relates to a case where the character image does not have any noise, and FIGS. 9B and 9C relates to cases where the character image have noises. A noise contained in the character image of FIG. 9B exists over positions (x, y)=(10, 3) and (11, 3), and noise contained in the character image of FIG. 9C is located at positions (6, 2) and (11, 2). It can be seen from FIGS. 9B and 9C that the algorithm of FIG. 8A can decide the appropriate position of the dividing line CUT-Y1 without being affected by the presence of noise contained in the top end of the character image. In FIG. 9B, the dividing line CUT-Y1 is located on the line 3, and the dividing line CUT-Y1 of FIG. 9C is located on the line 3. It will be seen from the above description that the dividing line CUT-Y2 can be obtained without being affected by the present of noise contained in the bottom end of the character image.

Figure 10A:
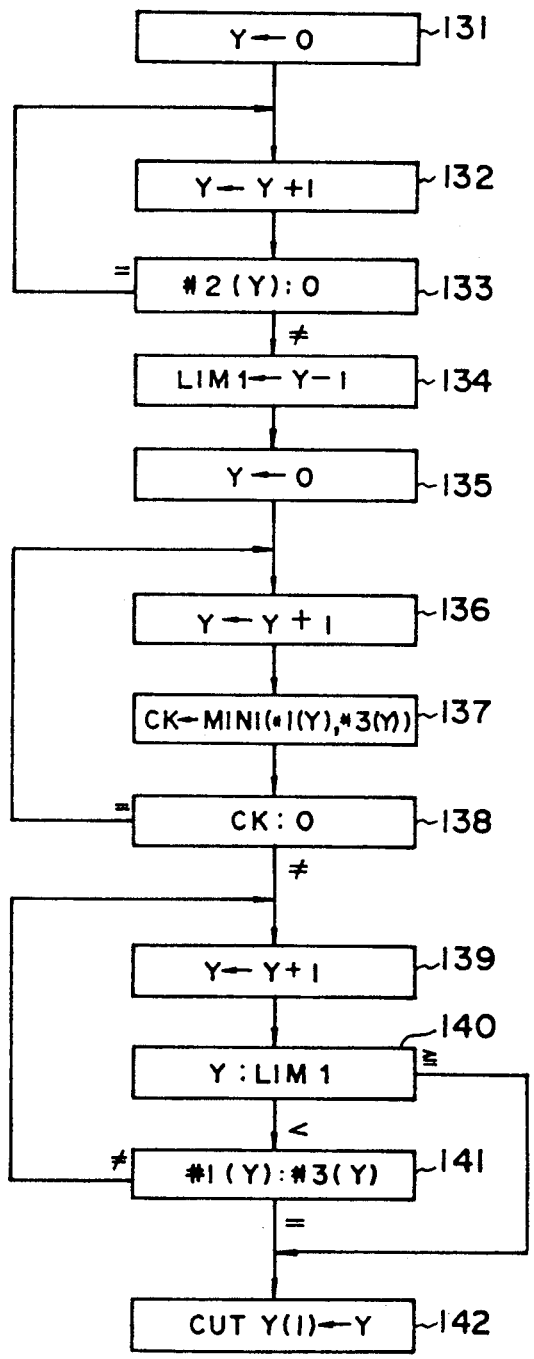
FIGS. 10A and 10B are detailed flowcharts of FIGS. 8A and 8B, respectively.
Figure 10B:
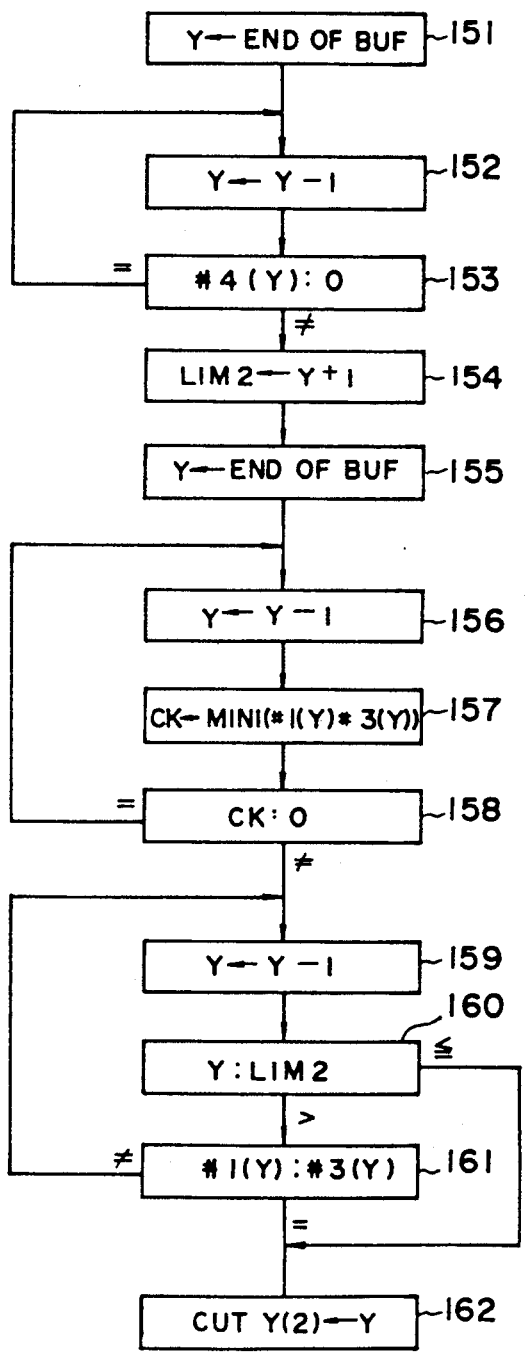

FIG. 10A is a detailed flowchart of the algorithm for deciding the dividing line CUT-Y1 shown in FIG. 8A, and FIG. 10B is a detailed flowchart of the algorithm for deciding the dividing line CUT-Y2 shown in FIG. 8B. A loop composed of steps 132 and 133, a loop consisting of steps 136 to 138, and a loop consisting of steps 139 to 141 of FIG. 10A correspond to steps 111, 112 and 113 of FIG. 8A, respectively. A loop consisting of steps 152 and 153, a loop consisting of steps 156 to 158, and a loop consisting of steps 159 to 161 of FIG. 10B correspond to steps 121, 122 and 123 of FIG. 8B, respectively. In FIGS. 10A and 10B, "Y" denotes Y'th line (row) of the image storage area including a character image, and "#1(Y)", "#2(Y)" and "#3(Y)" denote values of the projections of the direction codes #1, #2 and #3, respectively. "END OF BUF" denotes the least significant address of the generated projection.

In FIG. 10A, a value of 0 is inserted in Y in step 131. Then Y is is incremented by 1 in step 132. Then the value of the #2(Y) is compared with a value of 0 in step 133. A symbol ":" indicates a comparison. When both the values are equal to each other, the procedure returns to step 132. If not, LIM1 is set to Y−1 in step 134 and Y is set to a value of 0. In the example of FIG. 7, the end position LIM1 is decided to be on the line 3 (LIM1=3) in step 134. In step 136, Y is incremented by 1, and CK is set to MINI(#1(Y), #3(Y)) in step 137. An operator MINI(#1(Y), #3(Y)) denotes the selection of smaller one of #1(Y) and #3(Y), and "CK" is a working region. In step 138, the value of CK is compared with 0. When both the values are not equal to each other, the procedure returns to step 136. Adversely, when both the values are equal to each other, the procedure proceeds to step 139. In the example of FIG. 7, the line 2 for which the values of the projections of the direction codes #1 and #3 are not zero is detected in step 138. Thereafter, Y is incremented by 1 in step 139. Then, Y is compared with LIM1 in step 140. When LIM1 is greater than Y, #1(Y) is compared with #3(Y) in step 141. When both the values are not the same, the procedure returns to step 139. Alternatively when both the values are equal to each other, the procedure proceeds to step 142. When Y is greater than LIM1 in step 140, the procedure also proceeds to step 142. In step 142, a line having the current value of Y is decided to be the dividing line CUT-Y1.

Steps 151 through 162 of FIG. 10B will be obvious from the description regarding the algorithm of FIG. 10A. Therefore, a detailed description is not given of FIG. 10B.

EXAMPLE 2 OF STEP 102

Example 2 uses the horizontal projection of each of the direction codes #1 to #4 as in the case of the example 1 described before. The example 2 directs attention to the direction codes #2 and #4 indicating the horizontal directions.

Figure 12A:
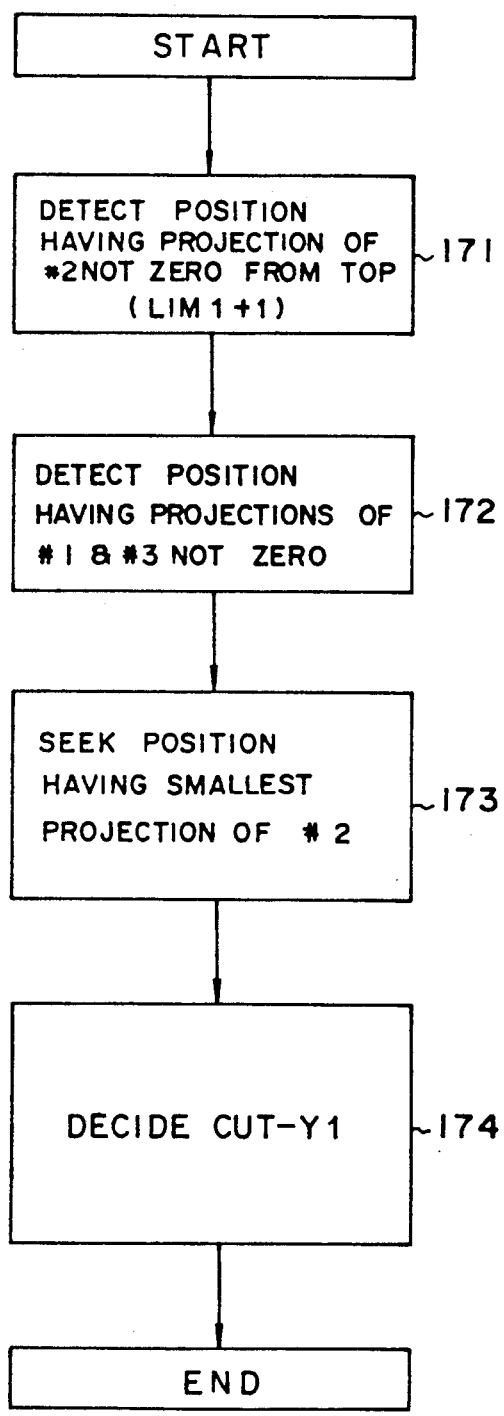
FIGS. 12A and 12B are flowcharts of the algorithm related to FIG. 11.
Figure 12B:
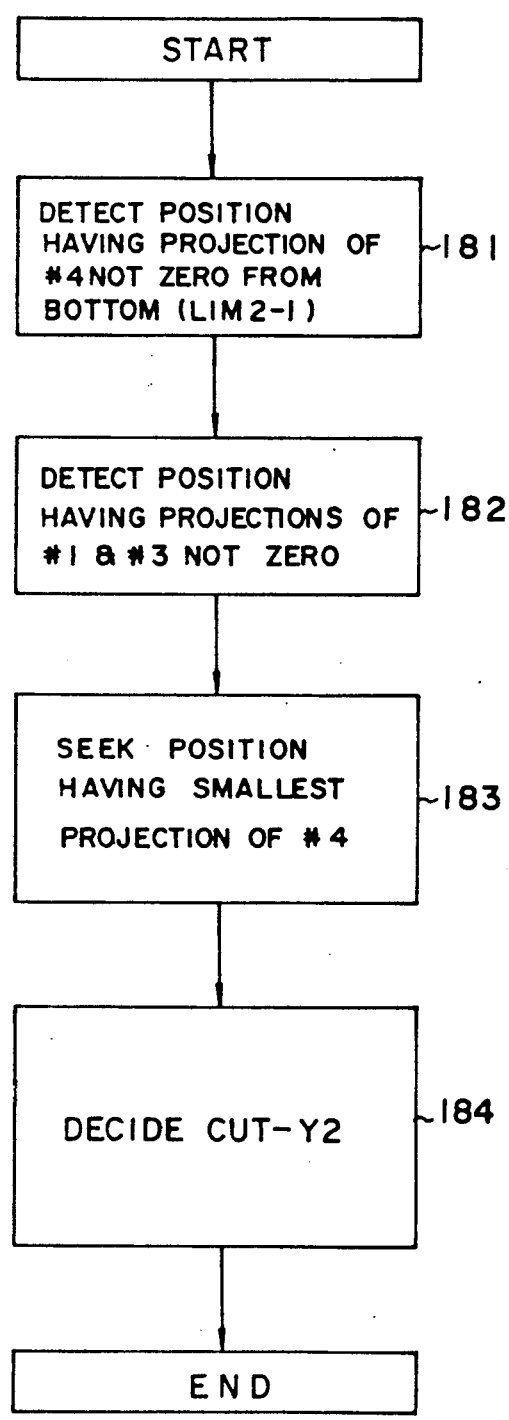

FIG. 11 is a view illustrating the example 2, FIG. 12A is a flowchart of an algorithm for defining the dividing line CUT-Y1 on the upper side of the character image, and FIG. 12B is a flowchart of an algorithm for deciding the dividing line CUT-Y2 on the lower side of the character image. In FIG. 12A, steps 171 and 172 are related to a procedure for obtaining a range within which the dividing line CUT-Y1 is sought. Step 173 and 174 define a condition for deciding the dividing line CUT-Y1. Step of FIG. 12B have the same functions as those of FIG. 12A.

In step 171 of FIG. 12A, a position at which the value of the horizontal projection of the direction code #2 becomes equal to a value other than zero is sought from top of the image storing area shown in FIG. 11(A). This position corresponds to LIM1+1. Then in step 172, a position at which the value of the horizontal projection of each of the direction codes #1 and #3 becomes equal to a value other than zero is sought from top of the image storing area. Thereafter, in step 173, a position at which there is obtained the smallest value of the projection of the direction code #2 is downwardly sought in the range from the position next to the position obtained in step 172 to the end position LIM1 of the range. When such a position is detected in step 173, the line related to the detected position is decided to be the dividing line CUT-Y1 (step 174). If the position is not detected in step 73, the line having the end position LIM1 is decided to be the dividing line CUT-Y1 (step 174).

In FIG. 12B, in step 181, a position at which the value of the horizontal projection of the direction code #4 becomes equal to a value other than zero is sought from the bottom of the image storing area. The found position corresponds to the position LIM2−1. Then, in step 182, a position at which the value of the horizontal projection of each of the direction codes #1 and #3 becomes equal to a value other than zero is sought from the bottom of the image storing area. Thereafter, in step 183, a position at which there is obtained the smallest value of the projection of the direction code #4 is upwardly sought in the range from the position next to (above) the position obtained in step 182 to the end position LIM2. When such a position is detected in step 183, the line related to the detected position is decided to be the dividing line CUT-Y2 (step 184). Alternatively when the position is not detected in step 183, the line associated with the end position LIM2 is decided to be the dividing line CUT-Y2 (step 184).

In this manner, the upper dividing line CUT-Y1 located on the line 3 and the lower dividing line CUT-Y2 located on the line 19 are obtained.

EXAMPLE 3 OF STEP 102

Example 3 uses projection of each of the direction codes #1 to #4 in the vertical direction. In example 3, a position at which there is obtained the first coincidence between the values of the direction codes #2 and #4 is sought from the right and left-hand ends of the image storing area.

FIG. 13A is a flowchart of an algorithm for defining a dividing line positioned on the left-hand side of the image storing area, and FIG. 13B is a flowchart of an algorithm for deciding a dividing line positioned on the right-hand side of the image storing area. The algorithm of FIG. 13A comprises steps 191 through 194, and the algorithm of FIG. 13B comprises steps 201 through 204. The example 3 corresponds to algorithm obtained by applying the algorithm of the example 1 described before to the decision of the dividing lines in the vertical direction. Therefore, the algorithm of FIG. 13A and 13B is obtained by simply exchanging "top" and "bottom" of FIGS. 8A and 8B with "left" and "right" and exchanging "#1" and "#3" with "#2" and "#4", respectively. For this reason, an explanation of FIGS. 13A and 13B is omitted here.

EXAMPLE 4 OF STEP 102

Example 4 uses the vertical projection of each of the direction codes #1 to #4 as in the case of the example 3. Embodiment 4 directs attention to the direction codes #1 and #3. The example 4 seeks a position where the smallest value of the vertical projection of the direction code #1 is within a range for seeking the dividing line positioned on the left-hand side of the image storing area, starting from the left-hand end of the image storing area. And the example 4 seeks a position at which the smallest value of the vertical projection of the direction codes #3 is within a range for seeking the dividing line positioned on the right-hand side of the image storing area, starting from the right-hand end of the image storing area.

Figure 14A:
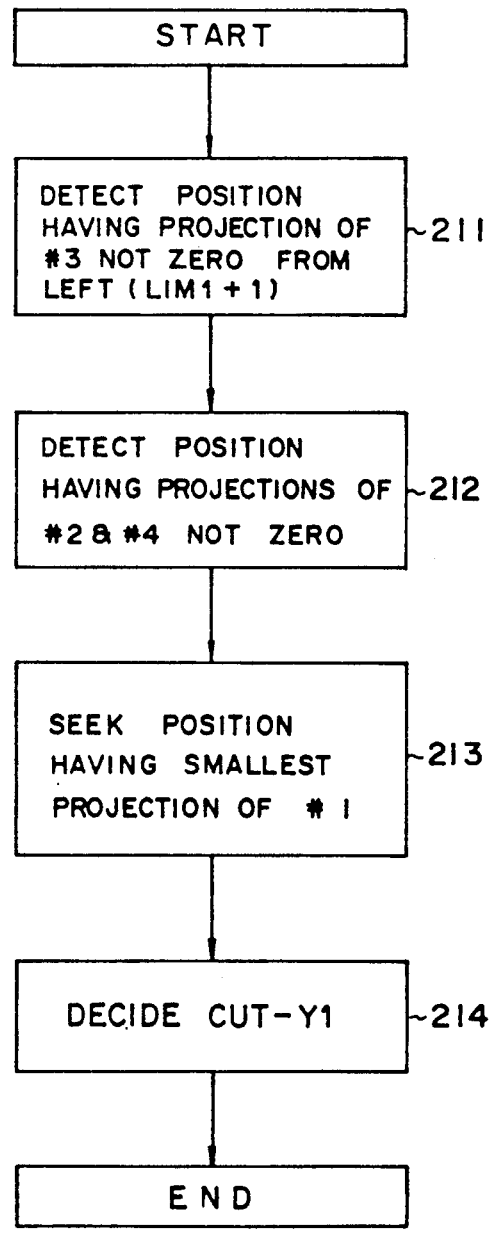
FIG. 14A and 14B are flowcharts of a further algorithm for defining dividing lines.
Figure 14B:
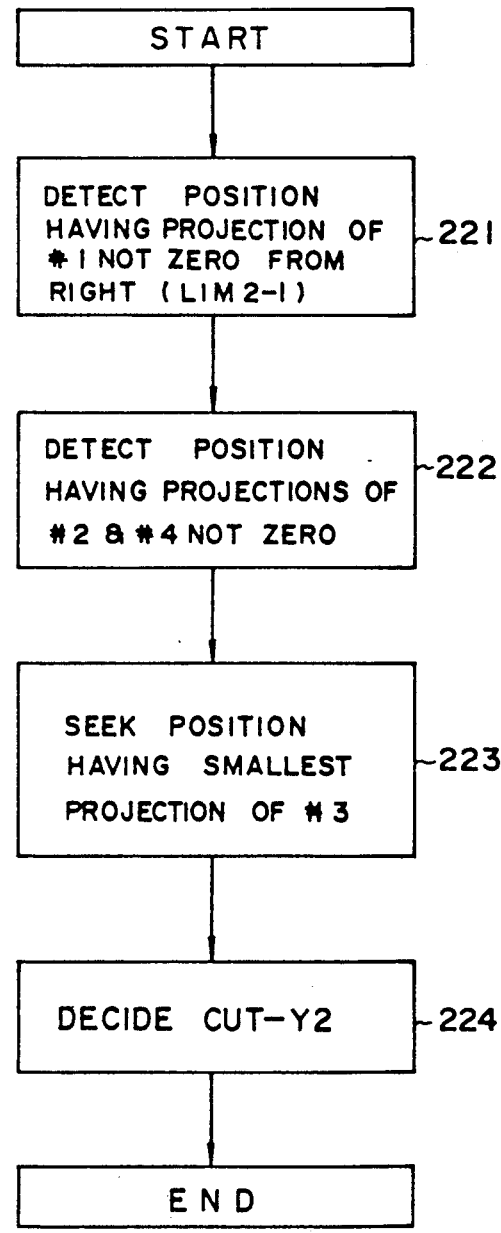

FIG. 14A is a flowchart of an algorithm for deciding the dividing line on the left-hand side of the image storing area, and FIG. 14B is a flowchart of algorithm for deciding the dividing line on the right-hand side of the image storing area.

Steps 211 and 212 of FIG. 14A are the same as steps 191 and 192 of FIG. 13A. That is, step 211 seeks a position where the value of the vertical projection of the direction code #3 becomes equal to a value other than 0, starting from the left-hand end of the image storing area. The found position corresponds to LIM1+1. Therefore, the end of the range for obtaining the dividing line on the left-hand side is the position LIM1. Then, in step 212, a position is sought at which both the value of the projections of the direction codes #2 and #4 become equal to values other than zero. Step 213 seeks, in the right-hand direction, a position at which the smallest value of the projection of the direction code #1 is obtained within a range between the line following (in the right-hand direction) the position obtained in step 211 and the position LIM2. Then, in step 214, a line related to the detected position is decided to be the dividing line on the left-hand side.

Steps 221 and 222 of FIG. 14A are the same as steps 201 and 202 of FIG. 13B. Step 223 seeks, in the left-hand direction, a position where the smallest value of the projection of the direction code #3 is obtained within the range between the line following (in the left-hand direction) the position obtained in step 221 and the position LIM2. Then, in step 224, a line related to the detected position is decided to be the dividing line on the right-hand side.

The examples 1 through 4 refer to the case where the feature quantities of the contour portion are represented by the direction codes #1 to 4. However, the examples 1 through 4 are not limited to the processing of the contour feature image represented by the direction codes and are applicable to cases where conventional codes other than the direction codes are used.

STEP 103 (FIG. 2)

In step 103, the direction code assigned contour image is divided into a plurality of segments by the dividing lines CUT-Y1 and CUT-Y2. Further, each of the segments is equally divided into a plurality of portions, or sub-segments.

Figure 15A:
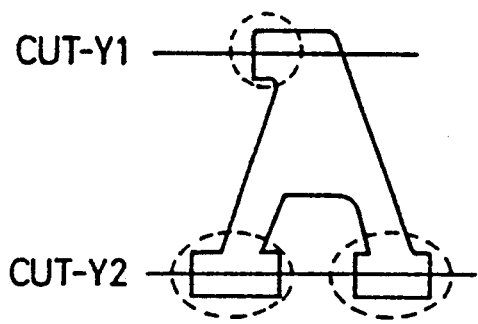
FIGS. 15A through 15E are views illustrating segments, sub-segments, combined segments and recombined segments.
Figure 15B:
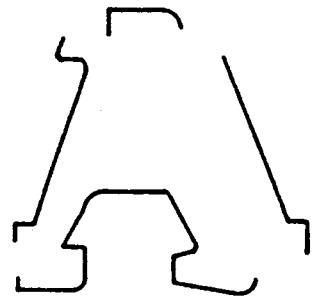

This procedure is described with reference to FIGS. 15A through 15E. FIG. 15A illustrates a capital letter "A" having ornamental portions surrounded by broken lines. When the procedure of step and 102 is subjected to the letter "A", a pair of dividing lines CUT-Y1 and CUT-Y2 are defined as illustrated in FIG. 15A. As shown in FIG. 15B, the character image is divided into 4 segments by the dividing lines CUT-Y1 and CUT-Y2. It is noted that the ornamental portion appearing on the upper portion of the character is divided into two portions. Similarly, each of the ornamental portions located on the lower portion of the character is divided into two portions.

Figure 15C:
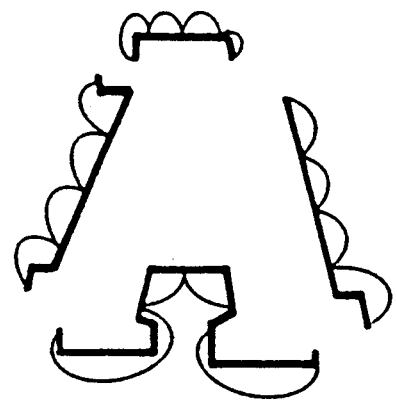

Further, each of the four segments is equally divided into 4 portions or sub-segments, as shown in FIG. 15C. This procedure can be done by referring to the coordinates of the character image. Positional information for the sub-segments are stored in the division data storing area 43 (FIG. 1).

STEP 104

Step 104 relates to a procedure for combining some of the sub-segments as shown in FIG. 15C together in accordance with a sub-segment combining table as shown in FIG. 16, which is stored in the ROM3.

The CPU 2 gives a segment number 'seg' to each of the segments. For example, as shown in FIG. 16, segment numbers 'seg' 1, 2, 3 and 4 are assigned to the 4 segments shown in FIG. 15B. Further, the CPU 2 assigns the sub-segments sub-segment numbers 'rgn'. For example, as shown in FIG. 16, sub-segment numbers 'rgn' 1, 2, 3, and 4 are assigned to the 4 sub-segments obtained for every segment. A sub-segment combining number shown in FIG. 16 indicates some sub-segments to be combined together, or in other words, shows how to combine some sub-segments together so as to form a combined segment.

Figure 17:
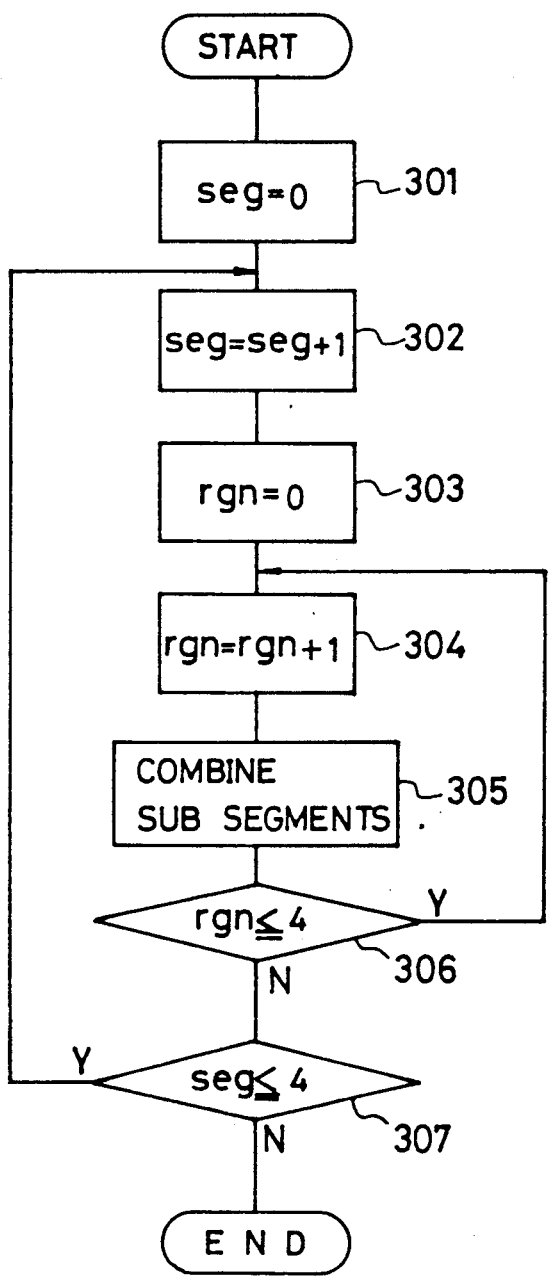
FIG. 17 is a flowchart of a sub-segment combining process.

The procedure related to step 104 is illustrated in FIG. 17. Referring to FIG. 17, the segment number seg is set to 0 so that it is initialized (step 301). Next, (seg+1) is inserted into seg, or in other words, the segment number seg is incremented by 1 (step 302). Then the sub-segment number rgn is set to 0 so that it is initialized (step 303). Thereafter, (rgn+1) is inserted into rng, or in other words, the sub-segment number is incremented by 1 (step 304). Then, the CPU 2 combines some sub-segments together by referring to the sub-segment combining table as shown in FIG. 16 (step 305). Then, the CPU 2 determines whether the current sub-segment number rgn is equal to or smaller than 4 (step 306). When the result in step 306 is YES, the procedure returns to step 304. Alternatively, when the result in step 306 is NO, the procedure proceeds to step 307, in which the CPU 2 discerns whether the segment number seg is equal to or smaller than 4 (step 307). If the result in step 307 is YES, the procedure returns to step 302. On the other hand, when the result in step 307 is NO, all the segments have been processed, and therefore the procedure is terminated.

In the example of FIG. 16, when rgn=1 in step 304, the sub-segment combining number is assigned to sub-segment number 1. Therefore, the sub-segment of sub-segment number 1 is used as one combined segment as it is. The table of FIG. 16 shows that the sub-segments of sub-segment numbers 2 and 3 should be combined together so as to form one combined segment of sub-segment combining number 2. Therefore, the CPU 2 combines these sub-segments together in step 305. The table of FIG. 16 shows that one sub-segment of sub-segment number 4 included in the segment of segment number 1 and one sub-segment of sub-segment number 1 included in the segment of segment number 2 should be combined together so as to form one combined segment of sub-segment combining number 3. Therefore, the CPU 2 combines these sub-segments in step 305. In this manner, some sub-segments are combined together so as to provide a plurality of combined segments (8 combined segments in FIG. 16).

Figure 15D:
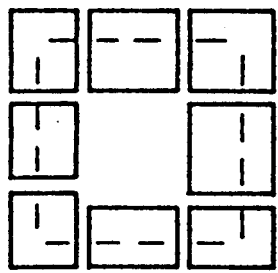
Figure 15E:
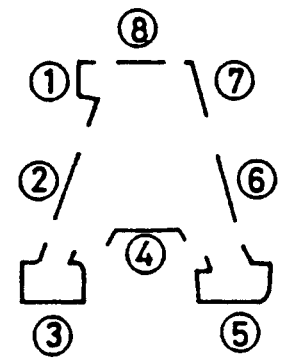

FIG. 15E illustrates the results obtained by subjecting the sub-segments shown in FIG. 15C to the procedure of FIG. 17. As illustrated in FIG. 15E, 8 combined segments are formed. FIG. 15D schematically illustrates how to combine some sub-segments. It can be seen from a comparison between FIGS. 15B and 15D that separated parts of each of the ornamental portions are combined together after executing the step 104 procedure.

STEP 105

In step 105, the combined segments obtained in step 104 are recombined together so as to form a predetermined number of recombined segments. The recombining process can be done in a way similar to the combining process of step 104.

Figure 18A:
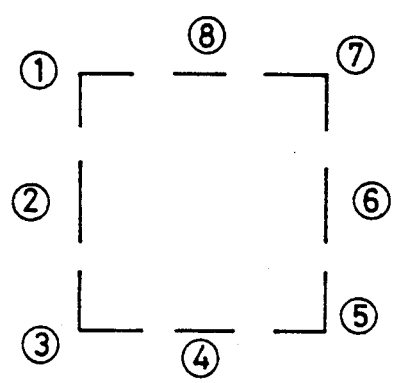
FIGS. 18A through 18C are views illustrating how to combine combined segments.

FIG. 18A schematically shows the result of step 104. Numbers ① to ⑧ indicate the combined segments. In step 105, the combined segments 1 to 8 are recombined in the following manner.

(1) = ① + ② + ⑧

(2) = ② + ③ + ④

(3) = ④ + ⑤ + ⑥

(4) = ⑥ + ⑦ + ⑧

Figure 18B:
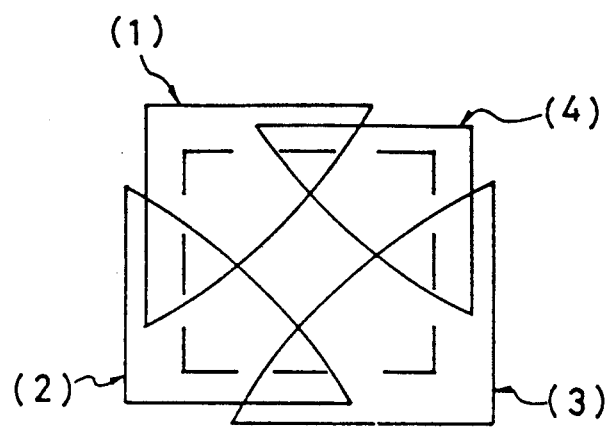

The above formulas showing how to combine the combining segments, are stored in the ROM 3 beforehand. The above-mentioned formulas are illustrated in FIG. 18B. It is noted that combined segment ② used in common in order to form the recombined segments (1) and (2). Similarly, the combined elements interposed between the combined segments located at the corners of the images are used in common in order to form the recombined segments. In the illustrated example, each of the recombined segments consists of a fixed number of combined segments, that is, 3 combined segments.

Alternatively, the recombined segments are formed in the following manner.

(1) = ①+②+③

(2) = ③+④+⑤

(3) = ⑤+⑥+⑦

(4) = ①+⑦+⑧

Figure 18C:
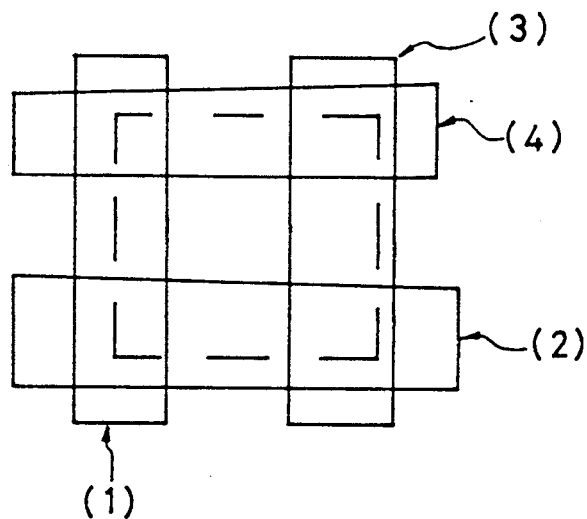

These formulas are illustrated in FIG. 18C. In the alternative, the combined segments used for forming corner portions of the character are used in common in order to form the recombined segments. In the illustrated example, each of the recombined segments consists of a fixed number of combined segments, that is, 3 combined segments.

STEP 106

In step 106, a histogram of the direction codes assigned to the contour is generated for each of the combined segments obtained in step 104. The histogram indicates a feature of each combined segment, and therefore a group of the histograms for all the segments indicates a feature of a character to be recognized. It is noted that each of the ornamental portions of a character image formed by the combined segments is not divided into parts, but is included into one combined segment. Therefore, it becomes possible to extract a stable feature taking account of ornamental portions of a character. In addition, noise due to the presence of a wavy portion appearing in the contour is effectively eliminated by the employment of a pair of dividing lines CUT-Y1 and CUT-Y2. The creation of a histogram can be done by a well-known method.

STEP 107

In step 107, a histogram of the direction codes assigned to the contour is generated for each of the recombined segments obtained in step 105. The histograms created in step 107 are roughly indicative of a feature of the character. Therefore, the histograms created in step 107 is useful to character classification, which is to be carried out prior to the character recognition procedure which uses the histograms obtained in step 106. Thereby, it is possible to considerably decrease the number of times that histograms are compared with histograms of reference characters stored in a dictionary.

In the above-mentioned embodiment, all the segments obtained in step 103 as shown in FIG. 15B are equally divided into a fixed number of sub-segments. Alternatively, the number of sub-segments may be changed for every segment. This can be done by extracting a topological feature of each segment associated with one related dividing line or both, and determining an appropriate number of sub-segments depending on the extracted topological feature.

The present invention is not limited to the aforementioned embodiments, and variations and modifications may be made without departing from the scope of the present invention.

What is claimed is:

1. A method of extracting a feature of a character comprising the steps of:
   (a) dividing a contour image of a character into a plurality of segments by referring to a pair of dividing lines provided for said contour image, said dividing lines crossing said contour image so that said dividing lines cross a width of a line forming said character, and said contour image being divided into the plurality of segments at dividing points selected from cross points where said dividing lines cross said contour image, said step of dividing said contour image including the steps of:
      (1) tracing white or black pixels arranged along said contour image;
      (2) assigning said white or black pixels direction codes indicative of respective directions of movement of said tracing; and
      (3) defining said pair of dividing lines by calculating a distribution of each of said direction codes;
   (b) dividing each of said segments into a plurality of sub-segments;
   (c) combining said sub-segments together to thereby form a plurality of combined segments in accordance with a predetermined rule indicative of a combination of said sub-segments, said predetermined rule representing that sub-segments located on each of said dividing points being included in an identical one of said combined segments; and
   extracting a feature of each of said combined segments.

2. A method of extracting a feature of a character as claimed in claim 1, wherein said sub-segments are combined together for a every predetermined number of sub-segments.

3. A method of extracting a feature of a character as claimed in claim 1, wherein said predetermined rule is in the form of a table which defines a first number for indicating said respective segments, a second number for indicating said respective sub-segments formed for every segment, and a third number for indicating said respective combined segments formed by combining some of said sub-segments together.

4. A method of extracting a feature of a character as claimed in claim 1, wherein said pair of dividing lines are parallel to each other and provided at upper and lower portions of said contour image.

5. A method of extracting a feature of a character as claimed in claim 1, wherein the feature of each of said combined segments is extracted from direction codes assigned pixels forming said contour image.

6. A method of extracting a feature of a character as claimed in claim 5, wherein said feature of each of said combined segments includes a histogram of said direction codes.

7. A method of extracting a feature of a character as claimed in claim 1, wherein a number of sub-segments to be formed by dividing each of said segments is selected based on a relationship between each of said segments and said pair of dividing lines.

8. A method of extracting a feature of a character, comprising the steps of:
   dividing a contour image of a character into a plurality of segments by referring to a pair of dividing lines provided for said contour image, said dividing lines crossing said contour image so that said dividing lines cross a width of a line forming said character, and said contour image being divided into the plurality of segments at dividing points selected from cross points where said dividing lines cross said contour image;
   dividing each of said segments into a plurality of sub-segments;

combining said sub-segments together to thereby form a plurality of combined segments in accordance with a predetermined first rule indicative of a combination of said sub-segments, said predetermined rule representing that sub-segments located on each of said dividing points being included in an identical one of said combined segments;

combining said combined segments together to thereby form a plurality of recombined segments in accordance with a predetermined second rule indicative of a recombination of said combined segments;

extracting a first feature of each of said combined segments; and extracting a second feature of each of said recombined segments.

9. A method of extracting a feature of a character as claimed in claim 8, wherein said first extracted feature is used for character recognition, and said second extracted feature is used for identifying a classification to which said character is related, and wherein when said character is subjected to a character recognition procedure, said character is classified based on said second extracted feature, and then said first extracted feature is compared with a reference feature related to said classification.

10. A method of extracting a feature of a character as claimed in claim 9, wherein said combined segments are combined together for a every predetermined number of combined segments.

11. A method of extracting a feature of a character as claimed in claim 8, wherein said combined segments are combined together so that combined segments among said combined segments located between said pair of dividing lines are used in common in order to form some of said plurality of recombined elements.

12. A method of extracting a feature of a character as claimed in claim 8, wherein said combined segments are combined together so that combined segments among said plurality of combined segments located at corner portions of said character are used in common in order to form some of said plurality of recombined segments.

13. A method of extracting a feature of a character as claimed in claim 8, wherein said second rule is defined in the form of a formula showing how to combine said combined segments.

14. A method of extracting a feature of a character as claimed in claim 8, wherein said step of:
dividing said contour image comprises the steps of tracing white or black pixels arranged along said contour image,
assigning said white or black pixels direction codes indicative of respective directions of the movement of said tracing, and
defining said pair of dividing lines by calculating a distribution of each of said direction codes.

15. A method of extracting a feature of a character as claimed in claim 8, wherein said pair of dividing lines are parallel to each other and provided at upper and lower portions of said contour image.

16. A method of extracting a feature of a character as claimed in claim 8, wherein the feature of each of said combined segments is extracted from direction codes assigned pixels forming said contour image.

17. A method of extracting a feature of a character as claimed in claim 16, wherein said feature of each of said combined segments includes a histogram of said direction codes.

* * * * *